Figure 1:
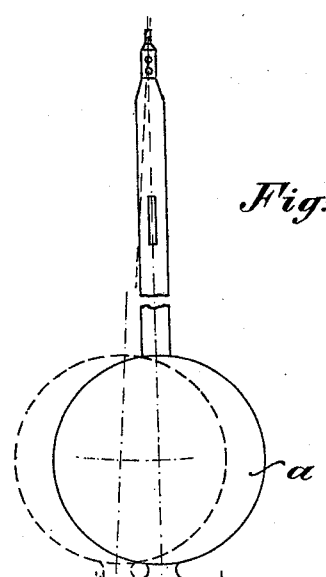

(No Model.) 2 Sheets—Sheet 1.

G. A. J. TELGE.
ELECTRIC METER.

No. 582,493. Patented May 11, 1897.

Witnesses:

Inventor
George A. J. Telge.
By Knight Bros.
Att'ys.

THE NORRIS PETERS CO., PHOTO-LITHO., WASHINGTON, D. C.

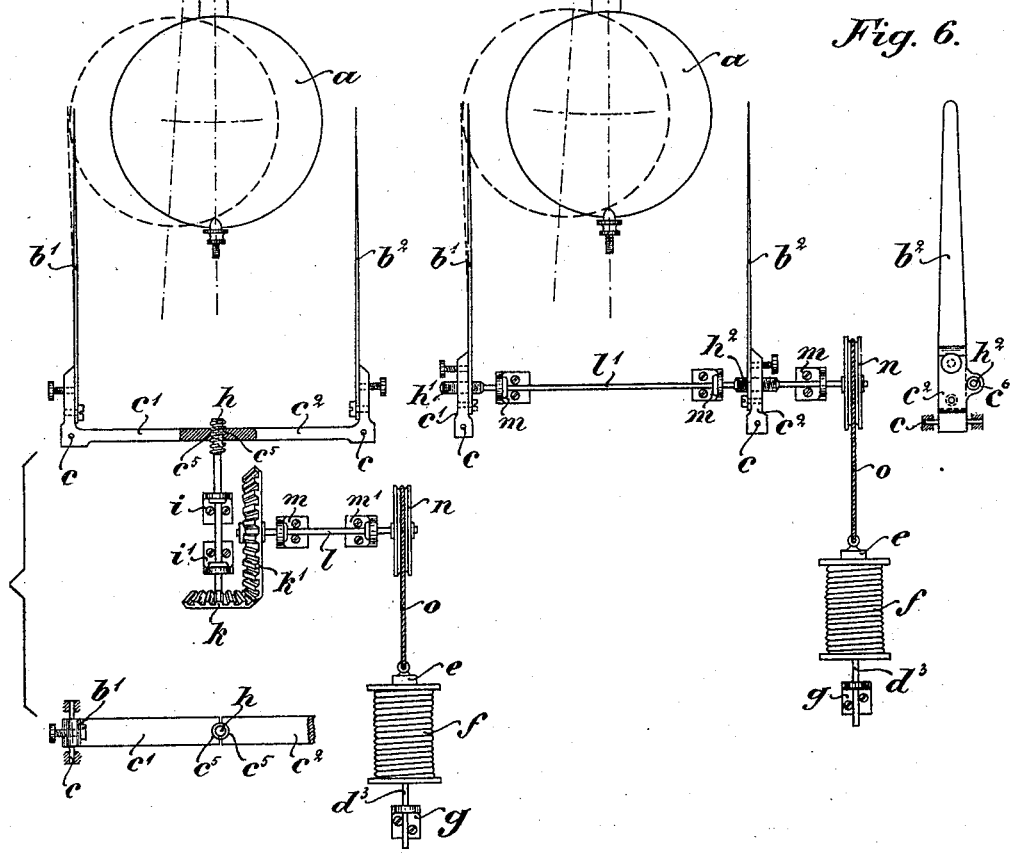

UNITED STATES PATENT OFFICE.

GEORG AUGUST JULIUS TELGE, OF OLDENBURG, GERMANY.

ELECTRIC METER.

SPECIFICATION forming part of Letters Patent No. 582,493, dated May 11, 1897.

Application filed November 16, 1896. Serial No. 612,379. (No model.)

*To all whom it may concern:*

Be it known that I, GEORG AUGUST JULIUS TELGE, a subject of the Grand Duke of Oldenburg, residing at the city of Oldenburg, German Empire, have invented a new and useful Electricity-Meter, of which the following is a specification.

This invention relates to electricity-meters of the kind in which the measurement of the current is effected by causing the current to be measured to influence the oscillations of the pendulum of a clock, and then the difference between the time indicated by the clock connected with this pendulum and the time indicated by another clock the pendulum of which is, however, not under the influence of any electric current serves to give the measure of the current caused to pass through the meter. Heretofore current-meters of this kind have been constructed with the pendulum subjected to magnetic attraction and having its amplitude of oscillation varied thereby.

Now the present invention is based, essentially, upon the fact that the pendulum is caused, according to the variation in the current, to impart to itself a greater or less acceleration by virtue of its own momentum or *vis viva;* and for the purpose of effecting this result the present invention consists in causing the pendulum to oscillate between two long weak springs which are automatically adjusted as to their position relatively to the pendulum by the movement resulting from the action of a coil through which the current is passed on a core arranged in relation to said coil in such a manner that on an increase or decrease of the current the said springs will be moved nearer to or farther away from the pendulum. The pendulum in swinging, for instance, to the left hand strikes against the spring on that side, and in pushing it back the pendulum imparts its momentum to the said spring. As soon as the pendulum is arrested (for the moment) thereby the force given up to the spring acts in the direction of the return stroke of the pendulum, and as this action becomes added to the action of the earth's attraction the pendulum is caused to swing back with corresponding acceleration. According as the spring is situated at a less or greater distance away—that is to say, according to the greater or smaller force of the current flowing through the coil—so the greater or smaller will be in proportion the acceleration of the return stroke of the pendulum.

An electric meter constructed in accordance with the present invention thus comprises the combination of a pendulum clock with upright and pivotally-arranged springs, one on each side of the pendulum, of a coil for the current to be measured, of a core influenced by the coil, and of a device for transmitting the movements resulting from the action of the coil on its core to the springs, so as to turn the same and thereby adjust the upper ends of them nearer to or farther away from the position of rest of the pendulum.

The said device preferably consists in a sliding piece with sloping sides, such as a cone or a wedge-shaped piece, arranged between pivoted levers to which the accelerating-springs are secured, or, instead of such sliding pieces, endless screws may be employed working in nuts the said levers are provided with.

The accompanying drawings illustrate this invention according to several modifications in respect of the device for adjusting the accelerating-springs, the clock being omitted with the exception of the pendulum.

Figure 2:
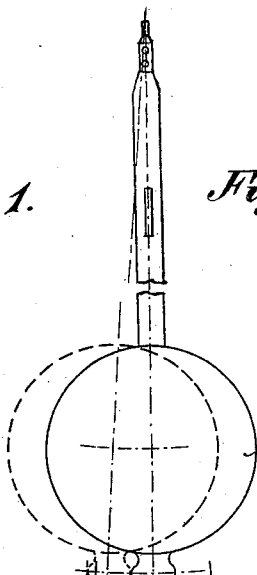
Figure 3:
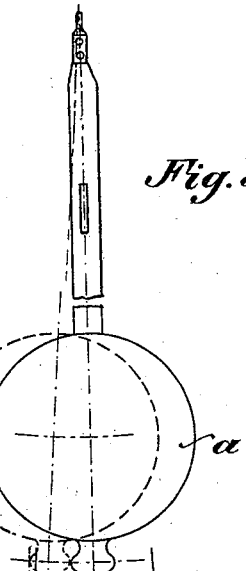

Figure 1 illustrates the arrangement which I preferably employ, in which the springs are adjusted by the vertical displacement of a double cone or double wedge. Figs. 2 and 3 illustrate modifications in which a single cone or wedge is employed instead of a double cone. Figs. 4 and 5 show two arrangements in which endless screws or worms are used to adjust the springs. Fig. 6 is a detail.

In all the figures, $a$ indicates the pendulum. $b'$ and $b^2$ are the two long accelerating-springs.

$f$ is the coil, and $e$ the core of the latter.

In Fig. 1 each of the two accelerating-springs $b'$ and $b^2$ is attached to a bent lever $c'$ or $c^2$, which is pivoted in its elbow on a pin $c$. These two bent levers have their pivots in one and the same plane and are arranged with their corresponding equal arms facing toward each other, the ends of which are provided with rollers $c^3$, between which there is adapted to slide the spring-actuating piece fixed to or forming the end of an upper rod-like prolongation $d$ of the core $e$. The said piece is composed of two slender congruent cones or wedges $d'$ $d^2$, arranged with their apices abutting together. The arrangement is such that the upper cone or wedge $d^2$ acts against the rollers of the upper arms of the levers, and the lower cone or wedge $d'$ acts against the rollers of the lower arms of the said levers. So long as the current acts with its normal strength the meeting-point of the apices of the two cones lies in the same plane as the pivots of the levers, and the two cones (wedges) are situated with equal cross-sections between the rollers. If the current increases, the coil draws the core farther in and the cones $d'$ $d^2$ move upward. $d'$ pushes the lower lever-arms apart, while $d^2$ allows the upper arms to move inward to the same amount. The springs $b'$ and $b^2$ are therefore set with their ends correspondingly closer to the pendulum. If the current diminishes, the coil allows the core to sink by its own weight, and the cones (wedges) $d'$ and $d^2$ now act in the reverse manner, so that the springs are moved away from the pendulum. The effect of the action of the pendulum upon the spring $b'$ on the left-hand side is indicated by dotted lines. The core $e$ is guided in a vertical direction at top and bottom in guides $g$ $g$ by means of its upper and lower rod-like extensions $d$ $d^3$.

Figs. 2 and 3 show simple modifications in which one-armed levers $c'$ and $c^2$ (downwardly directed in the first case and upwardly directed in the latter case) are employed, so that the prolongation of the core $e$ is consequently made in the form of a single cone or wedge which is arranged in the first case with its apex $d'$ pointing upward and in the second case with its base $d^2$ pointing upward. In these two arrangements the levers are kept against the cone by means of springs $c^4$. The mode of operation is the same as with the double cone.

In Fig. 4 the lower legs of the two bent levers $c'$ and $c^2$ are bent at right angles upwardly and inwardly, so that they are situated in a horizontal plane. The ends of these legs are formed as half-nuts $c^5$. These two half-nuts engage with the screw-thread of an endless screw or worm $h$, which is mounted vertically in bearings $i$ $i'$ and which is connected by means of bevel-wheels $k$ $k'$ with a horizontal shaft $l$, carried in bearings $m$ $m'$. On the shaft $l$ is mounted a pulley $n$, which is connected by means of a cord or chain $o$ with the core $e$ of a coil $f$, said core being guided vertically by means of a lower extension $d^3$, working in a guide $g$. To the other end of the chain there is attached a counterweight. (Not shown in the drawings.) When the core is sucked into the coil, the worm $h$ is rotated in such a manner as to draw down the two lever-legs, with the result of rotating the springs $b'$ and $b^2$ with their upper ends toward the pendulum. When the current diminishes, the reverse action takes place because the counterweight acts to turn the pulley $n$ back to a corresponding extent.

Instead of using a counterweight, obviously, as will be understood by every expert, a clock-spring or watch-spring or a torsion-spring may be connected to the pulley $n$ in such a manner as to be put in tension by the sucking in of the core.

In Fig. 5 the shifting of the two springs $b'$ and $b^2$ is shown effected by means of worm mechanism in a somewhat modified manner. The levers $c'$ $c^2$ are one-armed levers pivoting with their lower ends about pins $c$. One lever is adapted to be shifted by means of a right-hand screw $h'$ and the other by a left-hand screw $h^2$, said screws being arranged to work in nuts $c^6$, fixed to the levers, as shown in Fig. 6. Both these screws are arranged on a common horizontal shaft $l'$, which is connected with the core $e$ of the coil $f$ by means of a pulley $n$ and a cord or chain $o$, as in Fig. 4.

The influencing of the pendulum by the current through the medium of the springs $b'$ $b^2$ admits the employment of any well-working pendulum clock for the purpose of measuring current within wide limits.

What I claim, and desire to secure by Letters Patent of the United States, is—

1. In electricity-meters the combination, with the pendulum of a clockwork, a coil for the current to be measured, and a core for coöperation with said coil, of pivotally-arranged upright springs, one on each side of the pendulum, and means for transmitting the movements resulting from the action of the coil on its core, to said springs, substantially as and for the purpose stated.

2. In electricity-meters the combination, with the pendulum of a clockwork, a coil for the current to be measured, a core for coöperation with said coil, and upright springs one on each side of the pendulum, of pivotally-arranged levers to which said springs are secured, a slide-piece with sloping sides arranged between said levers and connected with said core, substantially as and for the purpose stated.

In testimony whereof I have hereunto set my hand in the presence of two subscribing witnesses.

GEORG AUGUST JULIUS TELGE.

Witnesses:
HERO HUREN,
JOHANN HINRICHS.